United States Patent [19]

Osterman et al.

[11] Patent Number: 5,864,669
[45] Date of Patent: Jan. 26, 1999

[54] METHOD AND SYSTEM FOR ACCESSING A PARTICULAR INSTANTIATION OF A SERVER PROCESS

[75] Inventors: Lawrence William Osterman, Woodinville; Bharat Shah, New Castle, both of Wash.

[73] Assignee: Microsoft Corporation, Redmond, Wash.

[21] Appl. No.: 680,231

[22] Filed: Jul. 11, 1996

[51] Int. Cl.[6] ..................................................... G06F 15/16
[52] U.S. Cl. .................................. 395/200.33; 395/200.31
[58] Field of Search ......................... 395/200.33, 200.31, 395/200.6, 200.53

[56] References Cited

U.S. PATENT DOCUMENTS

| | | | |
|---|---|---|---|
| 5,187,787 | 2/1993 | Skeen et al. | 395/600 |
| 5,218,699 | 6/1993 | Brandle et al. | 395/650 |
| 5,247,676 | 9/1993 | Ozur et al. | 395/650 |
| 5,283,856 | 2/1994 | Gross et al. | 395/51 |
| 5,619,650 | 4/1997 | Bach et al. | 395/200.01 |
| 5,761,507 | 6/1998 | Govett | 395/200.33 |

OTHER PUBLICATIONS

R. Srinivasan, "Binding Protocols per ONC RPC Version 2," Sun Microsystems, RFC 1833, Aug., 1995 pp. 1–14.
TCP/IP Tutorial and Technical Overview, http://www.tp3.ruhr–uni–bochum.de/rs6000–red books/html-books/gg243376.04//3376c410.html#rpc, Jun. 1995.
Jon Crowcroft, "Open Distributed Systems," http://www.c-s.ucl.ac.uk/staff/Jon/ods/ods.htm May 10, 1996.
DCE Glossary, http://www.ux1.eiu.edu/~csJay/dcehntro_to_dce_8.html 1996.
Arpc Messaging System, Ftp://ftp.cs.colorado.edu/pub/cs/distribs/arcadia/Arpc.txt Mar. 10, 1995.
Gregory Zelesnik, "The Unicon Language Reference Manual," http://almond.srv.cs.cmu.edu/afs/cs/misc/mosaic/all_mach/omega/Web//People/vit/unicon/reference–manual/Reference_Manual_44.html May 12, 1996.
John Shirley et al., Microsoft RPC Programming Guide, Mar. 1995, O'Reilly & Associates, Inc., Sebastopol, California.
Kramer, Matt, "Baranof's MailCheck 2.6 Delivers Improved Tools", PC Week, Sep. 11, 1995, Ziff–Davis Publishing Company 1995.
Frenkel, Gary, "cc:Mail View Keeps an Eye on Your Messaging System", Network Computing, Jun. 1, 1995, CMP Publications, Inc., 1995.

*Primary Examiner*—Mehmet B. Geckil
*Attorney, Agent, or Firm*—Workman, Nydegger & Seeley

[57] ABSTRACT

A computer-implemented method selects a desired copy of a particular interface in a computer system that includes a client computer and a server computer. The method includes, at the server computer, annotating the desired copy of the interface with an identifier, and, at the client computer, selecting the desired copy of the interface based on the associated identifier. The annotating and selecting steps may be implemented using the RPC protocol.

6 Claims, 2 Drawing Sheets

METHOD AND SYSTEM FOR ACCESSING A PARTICULAR INSTANTIATION OF A SERVER PROCESS

BACKGROUND OF THE INVENTION

The invention is directed to client/server computing systems.

A client/server computing system may include a client computer that communicates with a server computer over a network. In such a system, a client process (i.e., a process running on the client computer) causes a server process (i.e., a process running on the server computer) to perform an operation by sending a request to the server process over the network. The server process responds by performing the operation and returning any resulting data to the client process over the network.

Exchanges of requests and responses between the client and the server may be made using the Remote Procedure Call ("RPC") protocol. The RPC protocol is discussed, for example, in "Microsoft RPC Programming Guide", John Shirley and Ward Rosenberry, O'Reilly & Associates, Inc., Sebastopol, Calif., 1995, which is incorporated herein by reference.

The RPC protocol permits the client process to communicate with the server process by making a procedure call to the server process. RPC software running on the client computer automatically transmits the procedure call to the server computer. RPC software running on the server computer receives the procedure call and initiates a response by the server process. The RPC software then returns the results to the client computer.

Concepts defined by the RPC protocol include interfaces, endpoints, and binding handles. An interface is a description of the applications programming interfaces ("APIs") supported by a server application. A given application may have many interfaces that are accessed independently.

Each instantiation, or copy, of an interface is called an endpoint. The endpoint describes a communications port that a client process may use to communicate with the server. Viewed simply, an endpoint is an address at which a client may access the particular copy of an interface. An endpoint designates the name or address of the interface, the server on which the interface is located, and the communications protocol, or transport, by which the interface is to be addressed. For example, the endpoint designated by "ncacn_np:\\\\DINO[\pipe\lsasrv]" describes a process that uses the named pipe protocol (as indicated by "ncacn_np"), is located on the server "DINO", and is named "\pipe\lsasrv". Similarly, the endpoint designated by "ncacn_ip_tcp:157.55.23.48[1029]" describes a process that uses the TCP/IP transport (as indicated by "ncacn_ip_tcp") and is located at port "1029" of a server having the address "157.55.23.48".

A client process connects to a specific endpoint using a binding handle. As noted above, an endpoint may be viewed as providing an address at which a desired server process is located. A binding handle may be viewed as pointing to that address. More specifically, a binding handle designates a communication protocol sequence (i.e., the transport by which the endpoint is to be addressed), a server name or address for the corresponding endpoint, and a server process name or address for the corresponding endpoint.

In general, binding handles and endpoints may be fully or partially bound. A fully-bound handle (or a fully-bound endpoint) is one that completely describes the path to the server application. A server application that produces fully-bound endpoints defines a separate endpoint for each transport supported by the server application. A large number of transports (i.e., 20 or more) may be available on a given machine. Accordingly, the burden of defining an endpoint for every possible transport soon can become onerous. In addition, consideration must be given to guaranteeing that a chosen endpoint does not conflict with an existing endpoint for a different application or for a different instance of the same application.

To ease this burden, the RPC protocol permits a server process to define partially-bound endpoints. A client process may then communicate with the server process using a partially-bound handle and the partially-bound endpoint of the server process. A partially-bound endpoint may include the server name or address and the name or address of the server process, without including information about a particular transport to be employed. A partially-bound handle may include the same information, or may include only the server process name or address. A partially-bound handle that includes only the name of the server process might be used when the same server process is running on multiple, equally acceptable, servers.

The RPC software includes an endpoint mapper that enables the use of partially-bound handles and partially-bound endpoints. Each server process using the RPC protocol registers partially-bound endpoints with the endpoint mapper. When a client process wishes to communicate with a given server process, the client process provides the endpoint mapper with an appropriate partially-bound handle. The endpoint mapper responds by producing a fully-bound endpoint for a server process that has registered a partially-bound endpoint corresponding to the partially-bound handle. The endpoint mapper then provides the fully-bound endpoint to the client process. The client process produces a fully-bound handle using this fully-bound endpoint and connects to the server process using the fully-bound handle.

SUMMARY OF THE INVENTION

A computer-implemented technique permits differentiation between different instantiations of a partially-bound endpoint. When multiple instantiations (i.e., multiple instances) of a process are running on a server, each instantiation may provide the endpoint mapper with the same partially-bound endpoint. Similarly, a particular process may provide multiple instantiations of the same partially-bound endpoint. In existing systems, the RPC endpoint mapper does not allow the client process to differentiate between different instantiations of a given endpoint when making a request. Instead, the endpoint mapper simply returns the first registered endpoint that corresponds to the partially-bound handle provided by the client process.

In some cases, a client process may need to access a particular instantiation of an endpoint. For example, the same server process may be used to backup an information store and to backup a directory service, with a first instantiation of the server process providing backup of the information store and a second instantiation of the server process providing backup of the directory service. A client process that needs to backup the information store would need to access the first instantiation. However, the existing RPC endpoint mapper does not permit the client process to specifically request the first copy.

The technique of the present invention includes annotating the endpoints and permitting a client process to select a particular process from a group of processes that are all represented by the same endpoint by selecting a particular annotation. The RPC protocol permits a server process to annotate an endpoint when the process registers the endpoint with the endpoint mapper. Typically, the annotations are used in producing human-readable displays for use, for example, in debugging or system management. However, the annotation may also be retrieved from the endpoint mapper by a client process. Thus, a server process that wishes to provide an identifiable instantiation of an endpoint does so by specifying a known annotation when registering the endpoint. A client process then obtains a list of endpoints from the endpoint mapper and selects an instantiation having a desired annotation. The endpoint mapper acts as a registration authority for instantiations of the server process, and the annotations act as distinguishing identifiers for the instantiations.

The technique features having a client process running on a client computer select a particular instantiation of a server process running on a server computer that is connected to the client computer by a network. The technique includes providing a registration authority, such as an endpoint mapper, which is accessible to the client and server processes. Instantiations of the server process are registered with the registration authority. The registration includes associating a distinguishing identifier with at least one instantiation of the server process. Thereafter, the client process selects an instantiation of the server process based upon a distinguishing identifier associated with that instantiation.

Implementations of the technique may include one or more of the following features. The client process may request a list of instantiations of the server process. The list of instantiations may be provided by the registration authority, and may include distinguishing identifiers associated with particular instantiations of the server process. The client process may select an instantiation of the server process by scanning the list of instantiations to identify an instantiation associated with a particular distinguishing identifier and selecting the identified instantiation.

The registration authority may be a process running on the server computer. For example, the registration authority may be an RPC endpoint mapper. The technique may be implemented using the RPC protocol.

Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM, RAM or magnetic or optical disk) that is readable by a general or special purpose programmable computer (or other dedicated device capable of computing or communicating) for configuring and operating the computer to perform the procedures described in this document. The system also may be considered to be implemented as a computer-readable storage medium, configured with a computer program, where the storage medium so configured causes a computer to operate in a specific and predefined manner.

Other features and advantages will become apparent from the following description, including the drawings, and from the claims.

DESCRIPTION OF THE PREFERRED EMBODIMENTS

Figure 1:
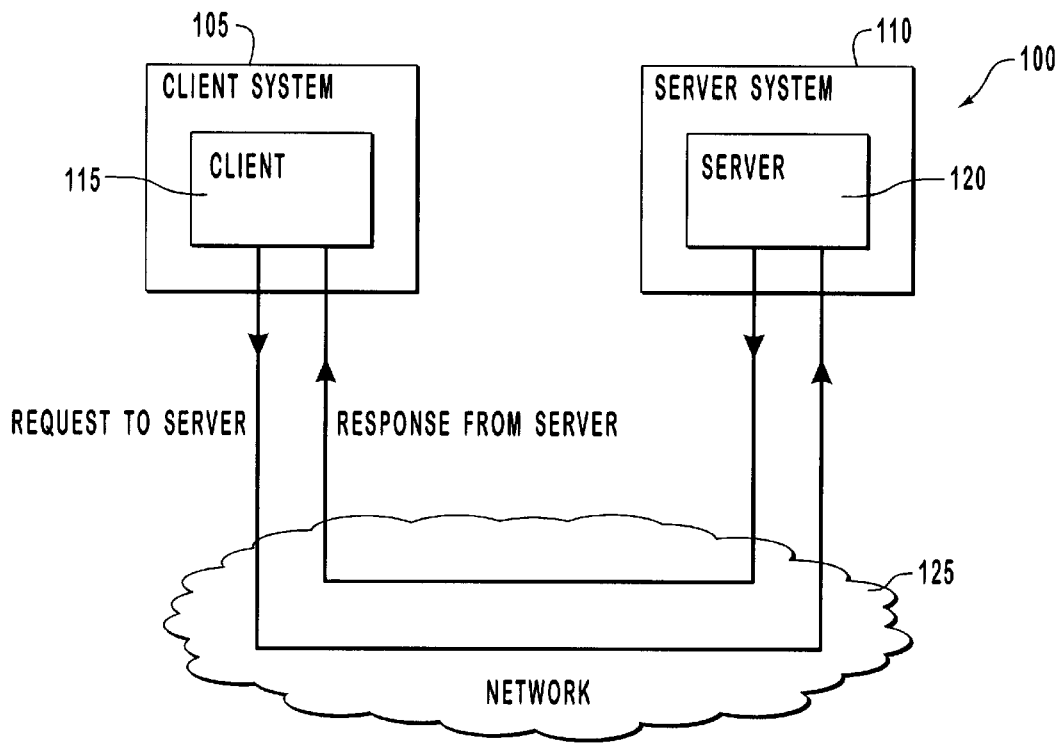
FIGS. 1 and 2 are block diagrams of a distributed client-server computer system.

FIG. 1 illustrates a distributed computing system 100 that includes a client system 105 and a server system 110. A client process 115 runs on the client system and a server process 120 runs on the server system. The client process 115 communicates with the server process 120 over a network 125.

Figure 2:
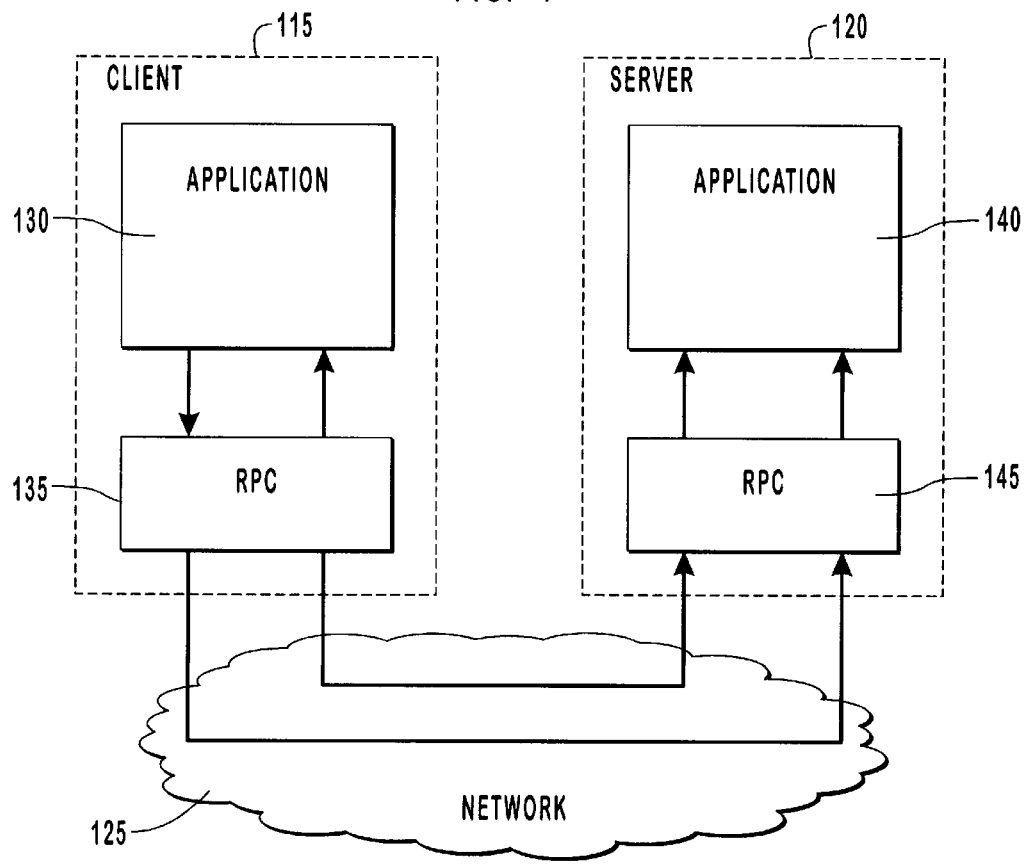

As shown in FIG. 2, the client process 115 includes application code 130 that provides functionality to a user. The application code 130 communicates with the server process 120 by making remote procedure calls ("RPCs") to the server process.

Client RPC software 135 is positioned beneath the application code 130. The client RPC software 135 receives RPCs from the application code 130 and sends them to the server process 120 over the network 125. Client RPC software 135 may be implemented using a standard RPC runtime library. The runtime library includes procedures that convert a request from the RPC handler software to an appropriate format for transmission to the server system 110 and transmit the converted request over the network 125. The runtime library also includes procedures that provide data integrity, data security and a transmission protocol appropriate for the network 125.

The server process 120 similarly includes application code 140 and server RPC software 145. The server RPC software 145, which also may be implemented using a standard RPC runtime library, includes procedures that format requests received from the client RPC software 135 and pass the requests to the application code 140. The RPC software 145 may be identical to the RPC software 135.

The application code 140 performs the procedure requested in the call and returns the results, if any, to the server RPC software 145. The server RPC software 145 transmits the results to the client process 115 over the network 125.

Figure 3:
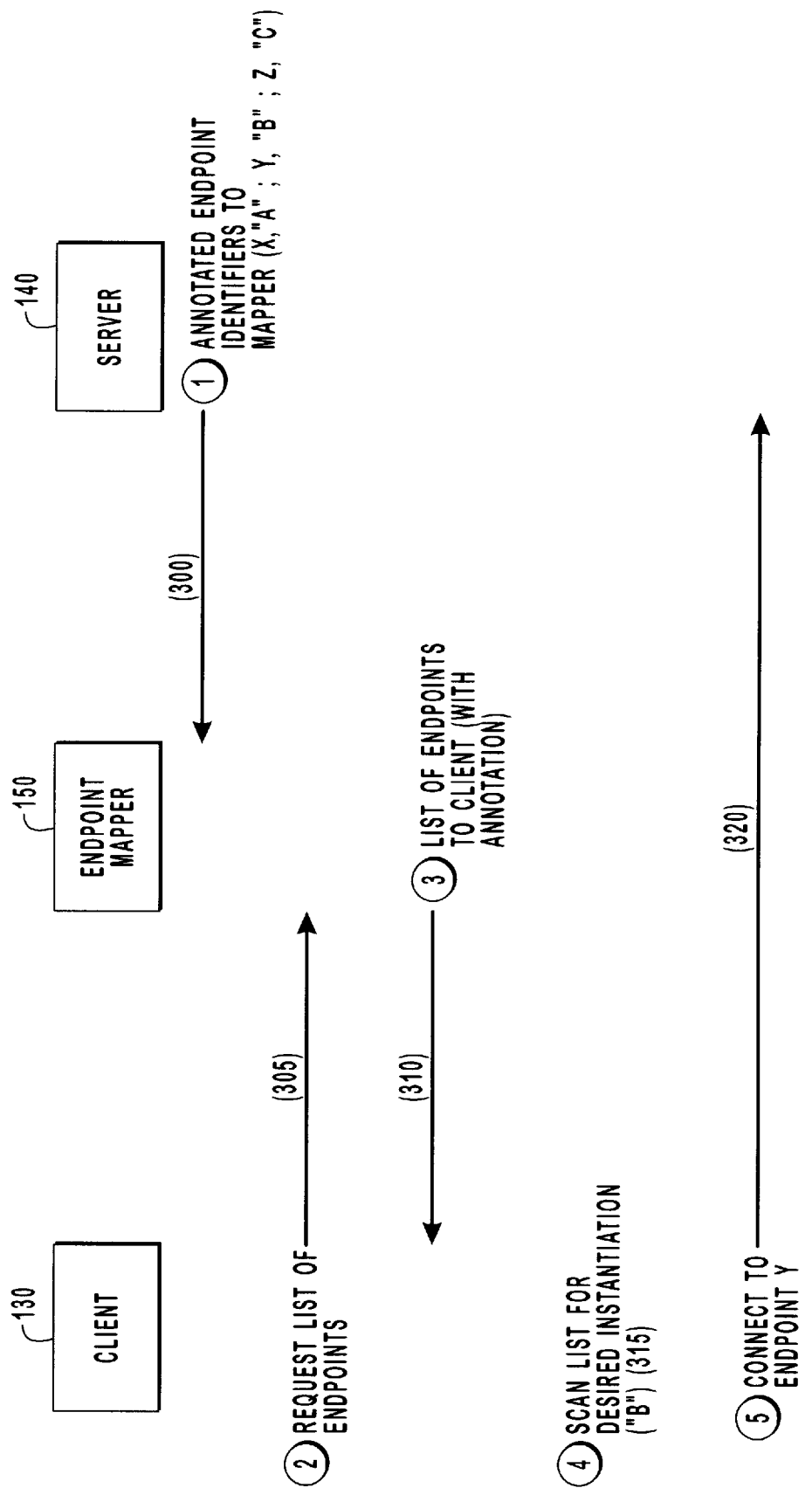
FIG. 3 is a chart illustrating flow of information between a client application, a server application, and an endpoint mapper of the system of FIG. 1.

Referring to FIG. 3, an endpoint mapper 150 permits client application code 130 to connect to a particular interface of server application code 140, or to a particular server process (i.e., to a particular copy of an endpoint), using a partially-bound handle. The endpoint mapper 150 may be implemented on the server system 110 as part of the server RPC software 145, on the client system 105 as part of the client RPC software 135, or on both the server system 110 and the client system 105.

To implement the technique for identifying a particular copy of an endpoint, the server application code 140 provides annotated, partially-bound endpoints to the endpoint mapper 150 when the server application code registers with the endpoint mapper (step 300). In a simplified example, endpoints "x", "y" and "z" may be annotated, respectively, with the strings "A", "B" and "C". Similarly, a backup procedure for backing up data files may be identified by the string "data files" while a backup procedure for backing up a directory service is identified with the string "directory service". Other server processes also provide endpoints (annotated or unannotated) to the endpoint mapper.

The server application code 140 provides an annotated endpoint by calling the RpcEpRegister API to register the endpoint. The call includes an identifying string for the endpoint in the Annotation parameter provided to RpcEpRegister. The RPC endpoint mapper 150 stores this annotation with the endpoint and returns the annotation if the annotation is requested using RpcMgmtEpElt APIs (RpcMgmtEpEltInqBegin, RpcMgmtEpEltInqNext, and RpcMgmtEpEltInqDone).

The server application code 140, when calling RpcEpRegister, also may specify an identifier that uniquely identifies the instance of the server application code. This identifier permits the RPC endpoint mapper to remove the endpoint associated with the instance when the instance terminates. If the server application code 140 terminated without calling RpcEpUnregister (which "unregisters" an endpoint), and the identifier was not specified, then the RPC endpoint mapper would not remove the old (now invalid) endpoint when a new instance of the application was started. This might prevent clients from connecting to the server since they would be attempting to connect to a nonexistent endpoint.

To access a particular copy of a partially-bound endpoint, the client application code 130 first requests from the endpoint mapper 150 a list of fully bound endpoints corresponding to a partially-bound handle (step 305). The endpoint mapper 150 responds with a list of endpoints corresponding to the partially-bound handle, along with associated annotations (step 310).

The client application code 130 makes the request to the endpoint mapper by calling the RpcMgmtEpEltInqBegin, RpcMgmtEpEltInqNext, and RpcMgmtEpEltInqDone APIs. As part of the call, the client application code identifies the remote server and the interface ID of the desired interface. The client application code also specifies the RPC__C__EP__MATCH__BY__IF inquiry type. The end point mapper returns to the client application code a list of fully-bound endpoints on the remote server that have the desired interface ID.

The client application code 130 then selects a desired endpoint from the list of endpoints (step 315). The client application code makes this selection by scanning the annotations returned by the endpoint mapper and selecting the endpoint having a desired annotation. Finally, the client application code connects to the desired endpoint using a fully-bound handle (step 320).

If the client wants to specify communication using a specific network transport, the client may use the RpcBindingBindingToStringBinding API and then call the Rpc-StringBindingParse API to determine the transport associated with a particular endpoint. If the transport of the particular endpoint does not match the desired transport, the client may move to the next endpoint on the list that is associated with the desired annotation. The client may repeat this process until an endpoint using the desired transport is found.

The technique described above may be used, for example, to select between different copies of backup/restore processes, resource monitoring agents, or administrative support processes for common dynamic link libraries ("DLLs"). For example, if a software product used a single DLL called EXCHMEM.DLL to provide common heap management functionality for all services, including an Information Store, System Attendant, Message Transport Agent, and Directory Service, EXCHMEM.DLL would run in at least four different processes on every server. If a heap monitoring capability (or a heap administrative capability) is desired for this DLL, the invention could be used to allow a client application to determine which services are available, and to select a particular service to monitor.

Other embodiments are within the scope of the following claims.

What is claimed is:

1. In a network computer system having at least a client computer, a server computer, and a network connecting the client and server computers, a method for a client process running on the client computer to select a particular instantiation of a server process running of the server computer, the method comprising the steps of:

providing a registration authority which is accessible to both client and server processes;

for each different instantiation of a server process running on a server computer, annotating each such instantiation so as to uniquely identify that instantiation;

registering each such uniquely identified instantiation of the server process with the registration authority;

permitting a client process to access the registration authority with a partially bound handle that requests identification of any instantiations of a particular server process that may be running at a server computer accessed by the client process;

said registration authority returning to the client computer a list of each uniquely identified instantiation of the requested server process; and the client process then selecting an instantiation the server process from the list that corresponds to a particular instantiation of the server process required by the client process.

2. The method of claim 1, wherein the registration authority is a process running on the server computer.

3. The method of claim 1, wherein the method is implemented using the RPC protocol.

4. In a network computer system having at least a client computer, a server computer, and a network connecting the client and server computer a computer program product for implementing a method for permitting a client process running on the client computer to select a particular instantiation of a server process running of the server computer, the computer product comprising:

a computer readable medium for carrying program code means; and wherein the program code means comprises executable instructions for implementing a method comprised of the steps of:

providing a registration authority which is accessible to both client and server process;

for each different instantiation of a server process running on a server computer, annotating each such instantiation so as to uniquely identify that instantiation;

registering each such uniquely identified instantiation of the server process with the registration authority;

permitting a client process to access the registration authority with a partially bound handle that requests identification of any instantiations of a particular server process that may be running at a server computer accessed by the client process; said registration authority returning to to the client computer a list of each uniquely identified instantiation of the requested server process; and the client process then selecting an instantiation of the server process from the list that corresponds to a particular instantiation of the server process required by the client process.

5. The system of claim 4, wherein the registration authority is a process running on the server computer.

6. The system of claim 4, wherein the means for providing a registration authority, the means for registering instantiations of the server process, and the means for having the client process select an instantiation use the RPC protocol.

* * * * *

UNITED STATES PATENT AND TRADEMARK OFFICE
CERTIFICATE OF CORRECTION

PATENT NO. : 5,864,669

DATED : Jan. 26, 1999

INVENTOR(S) : Lawrence William Osterman; Bharat Shah

It is certified that error appears in the above-identified patent and that said Letters Patent is hereby corrected as shown below:

Cover Page, Other Publications, left column, line 1, after "Protocols" change "per" to --for--

Cover Page, Other Publicatioins, left column, line 4, change "6000-redbooks" to --6000_redbooks--

Cover Page, Other Publications, right column, line 9, change "reference-manual" to --reference_manual--

Col. 6, line 47, after "server" change "computer" to --computers,--

Col. 7, line 3, after "returning" delete the second occurance of "to"

Signed and Sealed this

Nineteenth Day of October, 1999

Attest:

Attesting Officer

Q. TODD DICKINSON

Acting Commissioner of Patents and Trademarks